Patented Aug. 4, 1942

2,292,080

UNITED STATES PATENT OFFICE 2,292,080

17 - AMINO - 10,13 - DIMETHYL CYCLOPENTANOPOLYHYDROPHENANTHRENE COMPOUNDS AND METHOD FOR PRODUCING THEM

Russell Earl Marker, State College, Pa., assignor to Parke, Davis & Company, Detroit, Mich., a corporation of Michigan No Drawing. Application April 13, 1936,
Serial No. 74,226

5 Claims. (Cl. 260—397)

This invention relates to the synthesis of new sterol derivatives and in particular the amino derivatives of sterols which possess an amino group in position—17 of the sterol nucleus (Formula I). The structure of these compounds is illustrated by the general Formula II,

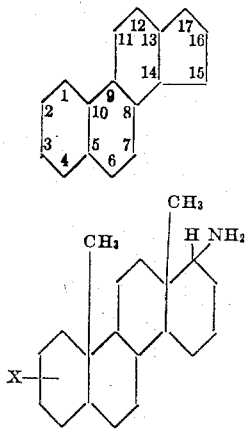

in which X represents halogen, hydroxyl or other univalent group. The sterol nucleus as presented bears a relationship to the so-called male sex hormones whereas corresponding structures in which ring A is benzenoid give rise to estrogenic principles closely related to the female sex hormones. The new products are of importance in the synthesis of various other sterols of physiological interest, as for example in the case where X represents a hydroxyl group, one may secure a dihydroandrosterone such as 3, 17-androstanediol by replacement of the amino group with a secondary hydroxyl group, which reaction may be accomplished by diazotization. Amino compounds of this type are also of interest because in contrast to the ordinary sterols, they yield water-soluble salts.

The invention now will be illustrated by a number of typical examples. Of main physiological interest are those compounds substituted by a hydroxyl group in position—3 but the invention is applicable to other sterol derivatives also, for example androsterone ethers and esters may be used. Moreover, reduction of the intermediate oximes to the desired amino compounds can be accomplished by catalytic methods instead of by sodium reduction.

*Preparation of 17-amino-androstane-3-ol hydrochloride.*—To a solution of 400 mg. of androsterone oxime in 100 cc. of dry amyl alcohol was added 5 g. of sodium in small portions. The amyl alcohol was refluxed until the sodium was dissolved. After cooling, water was added and the amyl alcohol layer separated. This was concentrated under reduced pressure. The resulting oil was distilled in high vacuum at 125°. The oily distillate which proved to be the desired amine, was converted into the hydrochloride by dissolving in ether and passing in a small amount of dry hydrogen chloride. The hydrochloride which precipitated was filtered off and crystallized from alcohol-ether mixture. M. 340° (dec.).

Analysis: Calc. for $C_{19}H_{34}ONCl$, C, 69.6; H, 10.9. Found C, 69.1; H, 10.5.

*Preparation of 17-aminoandrostane hydrochloride.*—To a solution of 400 mg. of alpha-3-chloroandrosterone oxime in 100 cc. of dry amyl alcohol, was added 8 g. of sodium in small pieces. The amyl alcohol was refluxed until the sodium had dissolved. Water was added and the amyl alcohol layer separated. This was concentrated and the amine distilled in high vacuum at 110°. A portion of this oil was dissolved in ether and treated with dry hydrogen chloride. The aminohydrochloride which separated was filtered off and crystallized from alcohol-ether. M. 345° (dec.).

Analysis: Calc. for $C_{19}H_{34}NCl$, C, 73.3; H, 10.9. Found C, 73.2; H, 10.9.

Those amino sterols may be subjected to various known reactions and a variety of derivatives prepared as for example by alkylation, acylation, etc. By treatment with nitrous acid they yield the corresponding alcohols as is illustrated by the following example.

*Preparation of 3.17-androstanediol.*—A solution of 200 mg. of 17-amino-androstane-3-ol in 5 cc. of acetic acid was diluted with 15 cc. of water. To this was added 5 drops of sulfuric acid. The solution was cooled and 3 g. of sodium nitrite slowly added. After standing 3 hours the solution was warmed to 60°. Water was added and the product extracted with ether. It was crystallized from ethyl acetate. M. 218–220°.

Analysis: Calc. for $C_{19}H_{32}O_2$, C, 78.0; H, 11.0. Found C, 78.2; H, 10.7.

What I claim as my invention is:

1. Process of producing 17-amino-androstane-3-ol by the reduction of androsterone oxime.

2. 17-aminoandrostane.

3. In the process of producing amino-substituted sterol derivatives and their water-soluble salts wherein the free amino sterol derivatives have the formula,

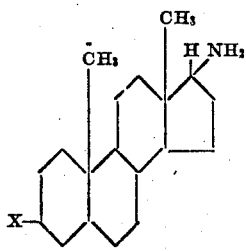

in which X is a member of the group consisting of hydrogen, hydroxyl and a group capable upon hydrolysis of conversion to hydroxyl, the step which consists in the reduction of a member of the group which consists, respectively, of a 3-halogeno androstane-17-keto-oxime, a 3-hydroxy androstane-17-keto-oxime and a $C_3$-substituted androstane-17-keto-oxime in which the $C_3$-substituent is a group capable upon hydrolysis of conversion to a hydroxyl group.

4. Process of producing a 3-hydroxy-17-amino-androstane which comprises reducing a 3-hydroxy-androstane-17-keto-oxime.

5. In the process of producing a 17-amino derivative of androstane, the step which consists in the reduction of a 3-halogeno androstane-17-keto-oxime with a reducing agent capable of replacing the 3-halogeno group with hydrogen and the 17-keto-oxime group with a 17-amino group.

RUSSELL EARL MARKER.